United States Patent
Darling et al.

(10) Patent No.: US 10,964,199 B2
(45) Date of Patent: Mar. 30, 2021

(54) AI-BASED MONITORING SYSTEM FOR REDUCING A FALSE ALARM NOTIFICATION TO A CALL CENTER

(71) Applicant: INSTANT CARE, INC., San Diego, CA (US)

(72) Inventors: Richard Allen Darling, Poway, CA (US); Fong-Min Chang, Diamond Bar, CA (US); Chih-Cheng Tai, Campbell, CA (US)

(73) Assignee: INSTANT CARE, INC., San Diego, CA (US)

( * ) Notice: Subject to any disclaimer, the term of this patent is extended or adjusted under 35 U.S.C. 154(b) by 0 days.

(21) Appl. No.: 16/532,478

(22) Filed: Aug. 6, 2019

(65) Prior Publication Data

US 2019/0392700 A1    Dec. 26, 2019

Related U.S. Application Data

(63) Continuation-in-part of application No. 15/471,323, filed on Mar. 28, 2017, now Pat. No. 10,380,880.

(60) Provisional application No. 62/421,900, filed on Nov. 14, 2016, provisional application No. 62/421,872, filed on Nov. 14, 2016, provisional application No. 62/421,888, filed on Nov. 14, 2016.

(51) Int. Cl.
*G08B 25/00* (2006.01)
*H04W 12/00* (2021.01)

(52) U.S. Cl.
CPC ........ *G08B 25/001* (2013.01); *H04W 12/002* (2019.01)

(58) Field of Classification Search
None
See application file for complete search history.

(56) References Cited

U.S. PATENT DOCUMENTS

| | | |
|---|---|---|
| 6,976,217 B1 | 12/2005 | Vertaschitsch et al. |
| 7,017,155 B2 | 3/2006 | Peev et al. |
| 7,382,786 B2 | 6/2008 | Chen et al. |
| 7,562,973 B2 | 7/2009 | Lapstun et al. |
| 7,711,796 B2 | 5/2010 | Gutt et al. |
| 7,911,341 B2 | 3/2011 | Raji et al. |
| 8,073,931 B2 | 12/2011 | Dawes et al. |
| 8,195,576 B1 | 6/2012 | Grigg et al. |
| 8,335,842 B2 | 12/2012 | Raji et al. |
| 8,367,235 B2 | 2/2013 | Huang |
| 8,473,619 B2 | 6/2013 | Baum et al. |
| 8,635,661 B2 | 1/2014 | Shahbazi |
| 9,141,276 B2 | 9/2015 | Dawes et al. |
| 9,245,119 B2 | 1/2016 | Mahaffey et al. |
| 9,253,209 B2 | 2/2016 | Muppidi et al. |
| 9,432,455 B2 | 8/2016 | Jeide et al. |
| 9,609,460 B2 | 3/2017 | Sinha et al. |

(Continued)

*Primary Examiner* — John F Mortell
(74) *Attorney, Agent, or Firm* — Platinum Intellectual Property LLP

(57) ABSTRACT

Methods of and devices for automatically reducing and/or eliminating false alarms to the call centers are disclosed. The method of reducing a false alarm notification to a call center can comprise receiving a triggered event notification on a mobile device, requesting a user to unlock the mobile device, and requesting the user to confirm a triggered alarm or dismiss the trigger notification using the mobile device using a non-GUI based user interface.

6 Claims, 6 Drawing Sheets

(56) References Cited

U.S. PATENT DOCUMENTS

| | | | |
|---|---|---|---|
| 2007/0182540 A1* | 8/2007 | Marman | G06K 9/00979 340/506 |
| 2010/0257490 A1* | 10/2010 | Lyon | G06F 3/0488 715/863 |
| 2016/0027292 A1* | 1/2016 | Kerning | H04W 4/14 455/404.2 |
| 2016/0196706 A1* | 7/2016 | Tehranchi | H04W 4/80 340/5.61 |
| 2016/0239191 A1* | 8/2016 | Krishnasamy | G06F 3/04883 |
| 2016/0300465 A1* | 10/2016 | Britton | G08B 13/19669 |
| 2019/0171178 A1* | 6/2019 | Burke | G08B 19/00 |

* cited by examiner

AI-BASED MONITORING SYSTEM FOR REDUCING A FALSE ALARM NOTIFICATION TO A CALL CENTER

CROSS-REFERENCE TO RELATED APPLICATION(S)

The present invention is a continuation-in-part of the co-pending U.S. patent application Ser. No. 15/471,323, titled "METHODS OF AND DEVICES FOR FILTERING TRIGGERED ALARM SIGNALS," which claims priority to the U.S. provisional patent application Ser. No. 62/421,900 titled "METHODS OF AND DEVICES FOR IMPROVING CALL CENTER EFFICIENCY," filed on Nov. 14, 2016, the U.S. provisional patent application Ser. No. 62/421,872 titled "METHOD OF AND DEVICE FOR EXTENDING AND TRANSFORMING WARNING SIGNALS," filed on Nov. 14, 2016, and the U.S. provisional patent application Ser. No. 62/421,888 titled "METHOD OF AND DEVICE FOR CONVERTING LANDLINE SIGNALS TO WI-FI SIGNALS AND USER VERIFIED EMERGENCY ASSISTANT DISPATCH," filed on Nov. 14, 2016, which are incorporated by reference in their entirety for all purposes.

FIELD OF INVENTION

The present invention relates to emergency response services. Specifically, the present invention relates to reduce false calls to the call center for requesting dispatch or assistance.

BACKGROUND OF THE INVENTION

Typically, triggered warning signals of a security system (e.g., a home security system) are directly sent to a service providing unit (e.g., a call center, a home security monitoring and response center, or Tele-Medical Call Center). Such warning signals generally require the service providing unit to maintain a service person that calls a designated person of the service subscriber to confirm a dispatch of an emergency assistant (e.g., police, fire, or ambulance) or to dismiss the warning signal, which takes substantial resources including numbers of service people and engaged service time. Nonetheless, a large ratio/number of all the warning signals are false alarms or situations that do not require the emergency assistant, which results in inefficiency in terms of wasted man hours for all service providers.

In the U.S., there are at least 400 k self-triggered false alarms that occur every year. The average costs for a call is at least $20. Thus, the estimated costs for the false alarms are at least 8 million dollars a year, which results in great wastes in resources.

SUMMARY OF THE INVENTION

Methods of and devices for automatically reducing and/or eliminating false alarms are disclosed. In some aspects, methods of preventing falsely/or mistakenly requesting a dispatch of a service from a call center are disclosed. In some embodiments, the methods and devices disclosed herein filter and/or eliminate falsely triggered event notification (e.g., self-filtering) before the police or security dispatch is requested. By self-filtering falsely triggered event notifications, the false requests made to the call center/dispatch center can be greatly reduced. As such, the number of calls that the call center needs to process can be greatly reduced. An advantageous aspect of the present disclosure includes having the user or security system (e.g., home security device) as the gate keeper to filter out falsely triggered event notification that can remove unwanted or unintended false calls made to the call center, so that the load of the calls to the call center can be greatly reduced.

In some embodiments, the term "falsely triggered event notification" refers to falsely triggered motion sensors. In an example, a user puts the home security system in an Armed Stay Mode, which configures the window sensors to monitor the event of window openings. When the user wakes up in the morning, he forgets that the sensors are in the Armed Stay Mode and opens the window before the user cancels the Armed Stay Mode at the home security system, which would trigger an event notification. Since it is a false event that is not a true alarm, it is referred to as "falsely triggered event notification." In contrast, if the event is triggered by an intended event or person (e.g., a thief), such notification is referred to as a normally triggered event notification.

User as a Gate Keeper to Filter Falsely Triggered Event Notification

In some embodiments, a triggered event notification is sent to a user's smart phone before such notification is sent to a call center. The triggered event notification with or without the image/video of the place being monitored is sent to the user's smart phone, which allows the user to decide whether to dismiss the triggered event notification. In some embodiments, the user is able to use voice or verbal command to dismiss the triggered event notification without using the user interface to set a control command. Other methods are able to be used for the user to dismiss the triggered event notification without using a displayed control interface. As such, the falsely triggered event notification can be filtered out by the user, which can reduce the load of calls that need to be processed by the call center.

Machine (e.g., Smart Device) as a Gate Keeper to Filter Falsely Triggered Event Notification In some embodiments, the method includes self-eliminating or self-filtering falsely triggered event notifications, which can be performed using a software implemented security device for performing artificial intelligent or machine learning to dismiss falsely triggered event notifications. The above mentioned functions can also be performed in a remote server or computing device that contains installed software.

In some embodiments, the local security device determines that the triggered event notification is a falsely triggered event (i.e., a falsely triggered event notification). Once the device determines that it is a falsely triggered event notification, the device (i.e., security system) dismiss the notification. So that no request of dispatch or triggered event notification will be sent to the call center. Instead, in some embodiments, a confirmation or notification (i.e., a decided notification) of a dismissal of a falsely triggered event notification is sent to the user's device (e.g., user's smart phone or PDA), which only notifies the user that the dismissal of the falsely triggered event notification has been made, and not further action is needed by the user unless the user disagrees with the above mentioned decision.

In some embodiments, the "decided notification" is sent to a user's smart phone for the user to confirm that the dismissal decision is made correctly. In such case, a user's input whether to dismiss a triggered event notification is not needed. Thus, the smart phone can be used to receive notification of a decision and dose not need a user to make a control decision.

Further Selected Methods of and Devices for Eliminating and/or Reducing Falsely Triggered Event Notifications The eliminating or filtering of the falsely triggered notifications can be performed via various methods. In the following, some selected aspects are disclosed.

In a first aspect, methods of verifying the identification is used to eliminate the falsely triggered event notification. In some embodiments, artificial intelligent is used to identify and/or verify the identity of the person. For example, a camera (e.g., images, videos, or photos) is used to capture a person's uniform, license plate number of a vehicle (e.g., car and truck), company name tag, etc. and processed through a public or private database to identify potentially permitted people, such as UPS delivery staff etc. In some embodiments, machine learning is used to learn about the user's behaviors or living habits. For example, a user generally wakes up before 10 am. Thus, the triggered event notification is determined to be false or likely false when such notification occurs after 10 am.

In some embodiments, biometrics authentication (e.g., biometry) is used as a form of identification, which includes using biometric identifiers. The biometric identifiers includes physiological characteristics, which can be related to the shape of the body. For example, fingerprint, palm veins, face recognition, DNA, palm print, hand geometry, iris recognition, retina, odor, and scent.

In some embodiments, behaviometrics authentication is used as a form of identification, which is related to the pattern of behavior of a person, including their typing rhythm, ways of walking, gait and voice.

In a second aspect, methods of designating a person responding to and/or verifying the triggered event notifications is used to eliminate the falsely triggered event notifications. In some embodiments, an App or a web portal is created allowing the owner to designate the responsive personnel. (i.e., the house owner could be designated as the first responsive personnel and his wife as the second responsive personnel.) If the Owner does not respond to the triggered event notification in a predetermined time, the system will transfer the alarm to his wife, and so on.

In a third aspect, methods of using a user's mobile phone location (i.e., GPS location) to determine who is the person and/or which is the device to notify are used to eliminate the falsely triggered event notification. The system is able to determine whether to further notify second responsive personnel based upon the phone location of the first responsive personnel (i.e. owner). If owner is not responsive and his phone is found in the bedroom or bathroom (or is not moving for a period of time), the system could notify the second responsive personnel (i.e. his wife or person designated) immediately based upon the predetermined rules or an AI setting. In the above scenario, when the user is in a shower and not able to access his phone, a designated person is able to perform the triggered event notification for the user.

In a fourth aspect, preventive security methods and devices are used to eliminate the falsely triggered event notification. In some embodiments, a surveillance camera is used to monitor the surrounding of a premise or structure, which does not need to be in an enclosed structure that is required by a typical security system. For example, a surveillance camera is used to monitor/detect the motion and identity of a person that has walked on to premises. The information captured can be processed by using artificial intelligent (AI), wherein the AI can help dismiss the triggered event notification and tag the notification as a falsely triggered event notification when the AI recognizes the person determined to be a permitted person. The recognition can use facial recognition, body shape, posture, movement/walking formation, gestures and other various factors to determine the identity of the individual.

Examples of Machine (e.g., Smart Device) as a Gate Keeper to Filter Falsely Triggered Event Notifications In one embodiment, the present disclosure introduces a method of reducing a false alarm notification to a call center. In a method, an artificial-intelligence-based (AI-based) monitoring system is trained to recognize a plurality of potentially-abnormal features. A potential risk for each of the plurality of potentially-abnormal features is defined. A pre-defined target region (such as 5 feet around the house) is then detected/monitored for recognizing the occurrence of at least one of the plurality of potentially-abnormal features. Also, a triggered notification is generated in response to the recognized occurrence of the at least one of the plurality of potentially-abnormal features. Therefore, a current potential risk of the target region, which is equal to a sum of potential risks related to the recognized occurrence of the at least one of the plurality of potentially-abnormal features, can be determined. In addition, the triggered event notification is degraded from an urgent level to a precautionary level when the current risk of the target region fails to exceed a predetermined substantial amount/ratio. The degraded triggered notification is then forwarded to the call center. Resources needed at the call center are reduced from a first tier (e.g., amount) of resources that corresponds to the emergent level to a second tier of resources that corresponds to the precautionary level in response to the degraded triggered notification. In addition, the call center by default responds to any triggered notification using the first amount of resource unless receiving a reduced trigger notification.

In one example, the triggered event notification comprises a triggered security alarm or warning. In one example, the triggered event notification comprises a non-emergency event notification. In one example, the triggered event notification includes a general maintenance notification. And in another example, the general maintenance notification comprises a low battery notification, a service issue notification, or a combination thereof.

In one example, one or more close-up headshots of a person's captured image is remotely captured and analyzed using an image analyzing device at the target region. The one or more headshots is compared in a database that stores images of authorized personnel of the target region. Identity and permission level of an identified person are compared and verified when there is a match in the database. Resource reduction at the call center is approved when the identified person's identity and permission level is verified and authorized at the time when the identified person's image is captured. In another example, an eye scanning procedure is remotely performed on the identified person at the target region.

In one example, a fingerprint scanning procedure is remotely performed on the identified person at the target region, so as to retrieve a fingerprint of the identified person. The retrieved fingerprint is compared in a database that stores fingerprints of authorized personnel of the target region. Identity and permission level of the identified person are confirmed when there is a match in the database. Resource reduction at the call center is approved when the identified person's identity and permission level is authorized at the time when the identified person's fingerprint is retrieved and analyzed.

In one example, a voice capture procedure is remotely performed on the identified person at the target region, so as to retrieve a voice feature of the identified person. The retrieved voice feature is compared in a database that stores voice features of authorized personnel of the target region. Identity and permission level of the identified person are confirmed when there is a match in the database. Resource reduction at the call center is approved when the identified person's identity and permission level is authorized at the time when the identified person's voice feature is retrieved and analyzed.

In one example, a motion capture procedure is remotely performed on the identified person or an identified object at the target region, so as to retrieve a motion feature of the identified person or object. The retrieved motion features are compared in a database that stores motion features of authorized personnel or objects of the target region. Identity and permission level of the identified person or object are confirmed when there is a match in the database. Resource reduction at the call center is approved when the identified person or object's identity and permission level is authorized at the time when the identified person or object's motion feature is captured and analyzed.

In one example, a gesture fetching procedure is remotely performed on the identified person at the target region, so as to retrieve a gesture feature of the identified person. The retrieved gesture feature is compared in a database that stores gesture features of authorized personnel of the target region. Identity and permission level of the identified person are confirmed when there is a match in the database. Resource reduction at the call center is approved when the identified person's identity and permission level is authorized at the time when the identified person's gesture feature is captured and analyzed.

In one example, a body shape capture procedure is remotely performed on the identified person at the target region, so as to retrieve a body shape feature of the identified person. The retrieved body shape feature is compared in a database that stores body shape features of authorized personnel of the target region. Identity and permission level of the identified person are confirmed when there is a match in the database. Resource reduction at the call center is approved when the identified person's identity and permission level is authorized at the time when the identified person's body shape feature is captured and analyzed.

In one example, a biometric feature capture procedure is remotely performed on the identified person at the target region, so as to retrieve a biometric feature of the identified person. The retrieved biometric feature is compared in a database that stores biometric features of authorized personnel of the target region. Identity and permission level of the identified person are confirmed when there is a match in the database. Resource reduction at the call center is approved when the identified person's identity and permission level is authorized at the time when the identified person's biometric feature is captured and analyzed.

In one example, a text feature capture procedure is remotely performed on the identified person or an identified object at the target region, so as to retrieve a text feature of the identified person. The retrieved text feature is compared in a database that stores text features of authorized personnel or objects of the target region. Identity and permission level of the identified person or object are confirmed when there is a match in the database. Resource reduction at the call center is approved when the identified person or object's identity and permission level is authorized at the time when the identified person or object's text feature is captured and analyzed.

In one example, a graphical feature capture procedure is remotely performed on the identified person or an identified object at the target region, so as to retrieve a graphical feature of the identified person. The retrieved graphical feature are compared in a database that stores text features of authorized personnel or objects of the target region. Identity and permission level of the identified person or object are confirmed when there is a match in the database. Resource reduction at the call center is approved when the identified person or object's identity and permission level is authorized at the time when the identified person or object's graphical feature is captured and analyzed.

In one example, a sound feature capture procedure is remotely performed on the identified person or an identified object at the target region, so as to retrieve a sound feature of the identified person. The retrieved sound feature is compared in a database that stores sound features of authorized personnel or objects of the target region. Identity and permission level of the identified person or object are confirmed when there is a match in the database. Resource reduction at the call center is approved when the identified person or object's identity and permission level is authorized at the time when the identified person or object's sound feature is captured and analyzed.

In one example, an odor feature capture procedure is remotely performed on the identified person or an identified object at the target region, so as to retrieve an odor feature of the identified person. The retrieved odor feature is compared in a database that stores odor features of authorized personnel or objects of the target region. Identity and permission level of the identified person or object are confirmed when there is a match in the database. Resource reduction at the call center is approved when the identified person or object's identity and permission level is authorized at the time when the identified person or object's odor feature is captured and analyzed.

In one example, the plurality of potentially-abnormal features includes a temperature profile at the target region. The AI-based monitoring system is further trained to recognize a human temperature distribution based on the temperature profile. A person appearing at the target region is identified when the identified person's temperature feature matches the human temperature distribution. An object appearing at the target region is identified when the identified person's temperature feature fails to match the human temperature distribution.

DETAILED DESCRIPTION OF THE INVENTION

Figure 1:
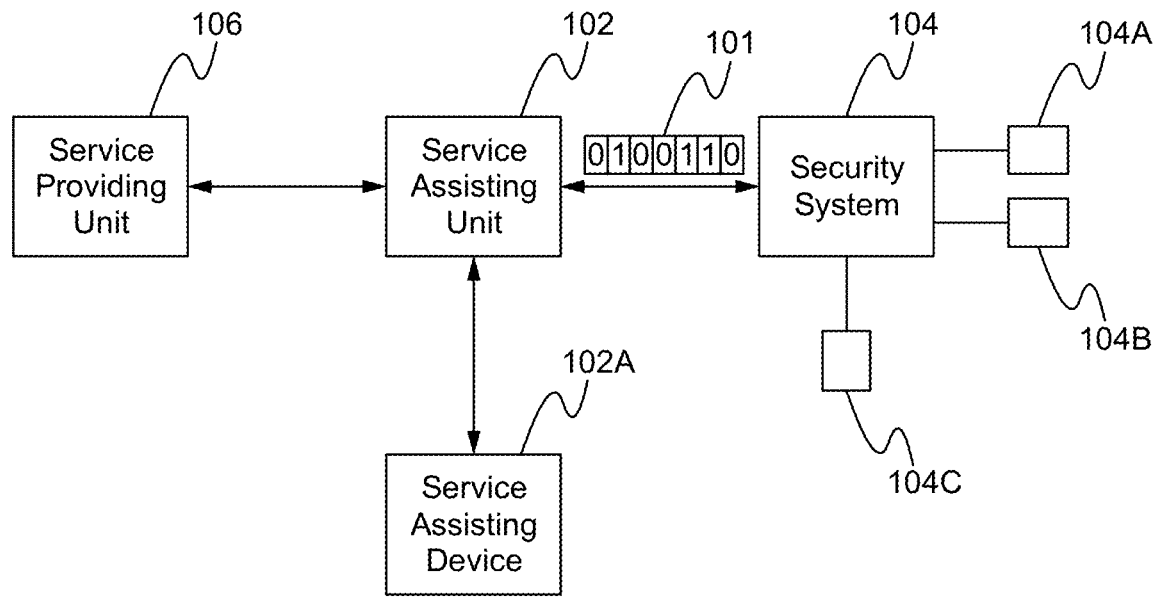
FIG. 1 illustrates a method of providing assistance to a service providing unit in accordance with some embodiments.

FIG. 1 illustrates an assisted service providing method 100 in accordance with some embodiments. In some embodiments, the method 100 includes a service providing unit 106 (e.g., a call center), a service assisting unit 102 (e.g., mobile phone), and/or a security system 104 (e.g., a home security system).

In some embodiments, the service providing unit 106 comprises a call center, a helpline responding center, or a Tele-medical call center. A person of ordinary skill in the art appreciates that the service providing unit 106 can be any real time/instant responding center. In some embodiments, the service providing unit 106 provides live person service, such as direct human verbal, text, or both responding services.

In other embodiments, the service providing unit 106 provides a machine responding service, including pre-recorded responding messages or instantly/event based machine generated response. For example, a machine provides an artificial intelligent (AI) trained verbal, text, and both responding service. In some other embodiments, a hybrid live person and machine mixed responding service is provided. For example, a live person is performing the initial greeting with asking critical questions as a portion of response and an AI machine performs basic information gathering as the second portion of the response.

In some embodiments, the service assisting unit 102 comprises a service assisting device 102A. In some embodiments, the service assisting unit 102 and/or the service assisting device 102A are/is used to reduce the resources needed for providing adequate/time sensitive/time is essence service level (e.g., less than 20 seconds waiting time) at the service providing unit 106. In some embodiments, the unit 102 and/or the device 102A comprises electric circuits and/or software blocking, eliminating, reducing, avoiding, and/or preventing false calls (e.g., falsely triggered event notification). With the reduction of the false calls to the call center, the resources needed at the call center and/or dispatch center can be reduced.

The resources needed at the call center and/or dispatch center include the number of staff needed, duration of the service, quantity of the service (e.g., questions needed to ask), and/or available call lines/internet/data bandwidth.

The false call includes false triggered alarm, further service unneeded/unwanted (e.g., severity does not require a further service from the call center or dispatch; the user/subscriber would like to take care of the alarm himself/herself; and the user would like to delegate another party to deal with the situation).

In some embodiments, the term "false call" disclosed in the present disclosure includes triggered event notifications or triggered alarm notifications that do not need the assistance from the call center or can be disposed by the user. In some embodiments, triggered notifications or triggered alarm notifications include emergency event notification (e.g., break-in alarm, security alarm, life-threatening event notifications) and nonemergency event notification (e.g., maintenance service notification, such as low battery notification). Any signals from the monitoring system that are able to be screened, filtered, examined, or reviewed by a user to determine whether the signals should be transmitted to the call center/service center are within the scope of the present disclosure.

In some embodiments, the service assisting unit 102 and/or the service assisting device 102A are/is used to reduce/assist services needed at the service providing unit 106. For example, some data collection or situation/background profiling has been performed partially or entirely at the unit 102 and/or device 102A.

In some embodiments, the service assisting unit 102 comprises/is implemented in a computer server. The computer server can be a server of a service providing company, such as a home security company, commercial security company, a call center, or a health care/emergency responding service providing company. The computer server can also be a third party server that provides service or information to the service providing company.

In other embodiments, the service assisting unit 102 comprises a computing chip that is contained in a server or a personal electronic device (e.g., smart phone, iPad, or a mobile device). In some other embodiments, the service assisting unit 102 comprises an APP (e.g., smart phone App)/software executable in a computer server or a personal electronic device (e.g., smart phone, iPad, or a mobile device, which can be the device 102A). In some embodiments, the APP can be downloaded from an APP store, such as Apple Inc's App store and GOOGLE® Play Store. A person of ordinary skilled in the art would appreciate that the unit 102 and/or the device 102A can be used alone, together in part or entirely, or interchangeably as software and/or hardware structured/constructed to perform the functions described herein.

In some embodiments, the assisted service providing method 100 sets a predetermined amount/ratio of a triggered warning signals 101 (e.g., a triggered home security monitoring system (e.g., a triggered event notification)) to be processed at the service assisting unit 102 before the warning signals 101 to be further processed by the service providing unit 106. In some embodiments, all or a substantial ratio (e.g., greater than 50.1%) of the triggered warning signals 101 are processed at the service assisting unit 102 before the service providing unit is able to take any service actions.

In some embodiments, the service assisting unit 102 and service providing unit 106 both receive the triggered warning signals 101 at the same time or in sequences, while having the service assisting unit 102 processing the signals 101 before further actions are taken by the service providing unit 106. Any sequences of processing the trigger warning signals 101 are within the scope of the present disclosure so long as the service assisting unit 102 provides assistance (e.g., assisted information; dismiss false calls) to the service providing unit 106.

In other embodiments, the service assisting unit 102 receives the triggered warning signals 101, and the triggered warning signals (e.g., an triggered event notification) 101 are not further transmitted to the service providing unit 106 unless the triggered warning signals 101 is first processed, filtered, or screened by the service assisting unit 102. The triggered warning signals can be the triggered event notification in some embodiments throughout the present disclosure.

In some other embodiments, the service providing unit 106 receives the triggered warning signals 101, and the triggered warning signals 101 are subsequently transmitted to the service assisting unit 102 from the service providing unit 106. The service providing unit 106 can be in a noted mode or standby mode waiting to take further actions (e.g., initiate call center engagement or dispatch emergency assistance) after the service assisting unit process, filter, verify, or screen the triggered warning signals.

In some embodiments, the triggered warning signals 101 are processed, filtered, verified, or screened based on various criteria. For example, the triggered warning signals 101 are verified not to be a false trigger, so that further actions are needed to be taken. In some examples, the triggered warning signals 101 are screened not to go beyond/reach a predetermined standard or condition, so that the system/device disclosed herein automatically dismiss the alarm or inquire the user whether to dismiss such alarm and not to take further actions. For example, a smoke triggered alarm signal does not reach the criteria of calling a fire department unless the temperature detected is beyond a predetermined temperature, such as 120° C.

In some embodiments, the security system 104 comprises a home security system, a health care monitoring system, or any other monitoring system. The security system 104 can be coupled with or contain various sensors or monitoring devices, such as a motion sensor 104A, a thermal sensor 104B, and/or a health condition monitoring sensor 104C. A person of ordinary skill in the art appreciates that any other sensors or monitoring devices can be coupled with the security system 104. Further, a person of ordinary skill in the art appreciates that the security system 104 can comprise any security or monitoring related components or devices, such as notification/communication components (e.g., an alarm, siren, WiFi, or phone line connections).

In some embodiments, the triggered warning signals 101 include a non-emergency event notification. For example, the security system 104 sends out a general maintenance notification, including a low battery status notification, a phone line status notification, a device performance status/check notification, and any other non-life threatening, non-potential property damage, or non-potential serious bodily harm event notifications.

In some embodiments, both emergency notification and non-emergency notification (e.g., all signals/notifications) are sent to a user's mobile device to be processed, filtered, verified, or screened by the user. The user serves as a filtering/screening mechanism, so that the user decides the course of actions to be taken. For example, a user is able to either dismiss the emergency notification or request a service from the call center. Further, a user is able to either enter an instruction (e.g., "Send Technician on Tuesday") on his/her mobile device. In some embodiments, a user's response to the triggered notification can include a pre-determined selection (e.g., a selection menu of "dismiss" and "Notify A Call Center") or a non-predetermined entry (e.g., allowing a user to enter a type-in service instruction.)

In some embodiments, the triggered notification is automatically transmitted to a call center when the triggered notification satisfies a predetermined criterion; whereas, the triggered notification can require a user's filtering action when the triggered notification does not meet the predetermined criterion. A person of ordinary skill in the art would appreciate that the system can be configured to require a user's intervention (e.g., filtering the triggered notification) with any predetermined criteria.

In some embodiments, the triggered warning signals 101 is sent to the service unit 102/service assisting device 102A, which requires a user to confirm the warning signals 101 as a verified triggered event notification or dismiss the warning signals 101 as a falsely triggered event notification. When the user verifies the triggered event notification as a verified event notification, the verified event notification is sent to the service providing unit 106 for dispatching needed assistance or for further processing at the service providing unit 106.

In some embodiments, the triggered warning signals 101 is deemed a verified triggered event notification or a wait-to-be determined warning notification if the user does not perform a verification or dismissal within a predetermined duration (such as 5 minutes).

Figure 2:
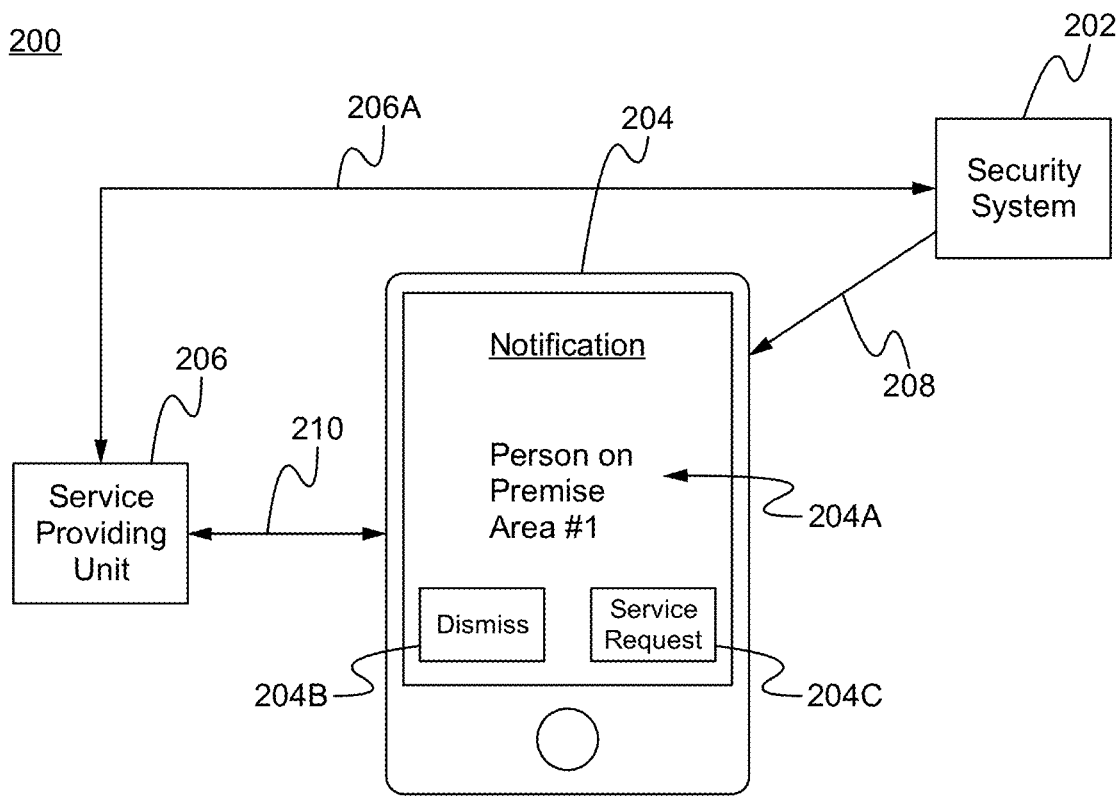
FIG. 2 illustrates a method of filtering false alarm and providing processed information in accordance with some embodiments.

FIG. 2 illustrates a warning signal filtering and/or assisting information providing method 200 in accordance with some embodiments. The method 200 provides an operational process and/or electronic signal communication hardware construction using a user (e.g., a service subscriber) and/or his personal electronic device as a false alarm filtering mechanism or device.

In some embodiments, a security system 202 (e.g., a home security system) sends triggered event signals 208 to a user's mobile device 204 (e.g., smart phone). The mobile device 204 contains an installed App or software implemented with a false call reducing or assisting program or App. A triggered event notification 204A (e.g., a break-in event) is displayed on the mobile device 204, which indicates a sensed abnormal status of the monitored premise. A dismiss button 204B and a service requesting button 204C are also shown/displayed on the mobile device 204 via the APP and/or software. When a user clicks/selects the "Dismiss" button 204B, the triggered event signal 208 is canceled. When the user clicks/selects the "Service Request" button 204C, a service requesting signal 210 is transmitted to the service providing unit 206, which can be a call center. The service providing unit 206 can then call a service subscriber or a user of the mobile device 204 to discuss or seek instructions for taking further actions, such as calling police or any other emergency dispatch. In some embodiments, the service providing unit 206 is able to remotely turn off the alarm or re-set the alarm at the security system 202 via one way or two way signals 206A.

In some embodiments, the method 200 can provide an emergency notification filtering mechanism or process, which filters out false alarm signals from the security system 202, such that the resources of the service providing unit 206 (e.g., service person's time and direct communication between the service person and the subscriber) can be used on or only used on filtered/actual service required warning notification signals.

In some embodiments, the method 200 includes at least three signal processing processes: (1) triggered alarm signal receiving, (2) triggered alarm signal filtering and/or verifying, and (3) processing/receiving a user's control command and/or providing further information from the user that is related to the triggered alarm signal (e.g., the user's verbal or text description of the user's knowledge or observation.) The above described process is referred to as User Based Alarm Filtering Method or "UBAF" hereinafter. In some embodiments, the above described process is performed on a user's mobile device, on a remote server, or a combination thereof.

In some embodiments, a triggered notification is sent to the user's mobile device (e.g., the mobile phone 204) for the user to decide the disposition of the notification. In some embodiments, the selections that are provided to the user include "Dismiss" or "Request a Service." For example, a "Dismiss" button 204B and "Service Request" button 204C are provided to the user. In another example, the user is able to verbally provide a command for dismissing the notification or requesting a service. Any other command selections or command manners are within the scope of the present disclosure.

In some embodiments, a service request signal is transmitted from the mobile device (e.g., a mobile phone 204) to a service providing unit when a Service Request is selected. The service providing unit can be a call center, a law enforcement department (e.g., San Jose Police Department), or any other emergency response units/organizations. When the emergency response units/organizations receives service request from the user, proper assistance can be provided.

In an exemplary embodiment, a triggered notification is sent to the user's mobile phone 204 directly from a home security system (e.g., a home security alarm system). In some embodiments, the trigger notification is sent to the user's mobile phone 204 directly without transmitting to a call center. The user is able to decide to dismiss the notification, request a service assistant (e.g., talking to the people at the call center), or request an emergency help/dispatch from a police department. In some embodiments, the trigger notification can be sent (e.g., passing on without perform active action) to the call center through the user's command or when the user does not perform an action for a predetermined duration (e.g., 30 seconds). In some embodiments, the triggered notification can be separately sent to the call center as well as the user's mobile device. In other embodiments, the triggered notification goes-through the call center's server without being handled by a live person (e.g., for recording purpose) and then transmitted to the user's mobile device for the user to decide what action to take.

In either case where the user dismisses the notification, or requests the emergency help/police dispatch the needed/engaged service level with the commercial call center is reduced or eliminated (e.g., only recording the triggered notification occurrence data without the need for the user to talk to the person at the call center). In such cases, the overall call numbers or duration for the users to talk to a designated call center are reduced or eliminated.

Figure 2A:
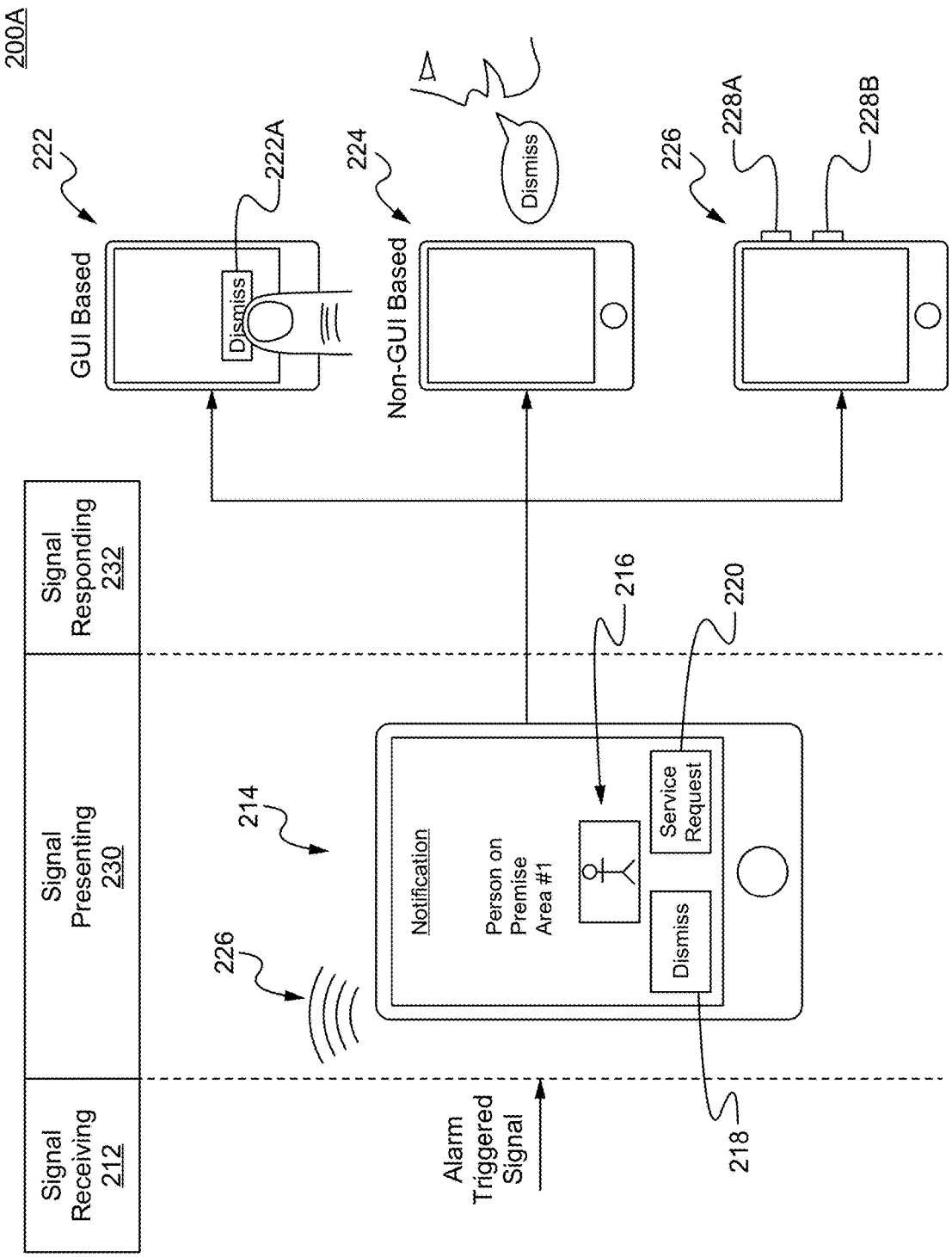
FIG. 2A illustrates a triggered alarm filtering method in accordance with some embodiments.

FIG. 2A illustrates a triggered alarm filtering method 200A in accordance with some embodiments. Similar to the method 200 of FIG. 2 described above, each of the UBAF procedures is able to interface/communicate with the user using a Graphical User Interface ("GUI") based method, a non-Graphic User Interface based ("non-GUI") method, or a combination thereof.

In some embodiments, the GUI based method includes presenting/notifying the user of the triggered alarm signal on a GUI implementable media (e.g., a LCD or LED display on a smart phone; touch screen on the IPHONE®), providing the triggered alarm related information (e.g., a video view of the alarm triggered scene), receiving user's commands and inputs, and/or a combination thereof.

In some embodiments, the GUI based method includes presenting an image outside of the mobile device. For example, an image has been projected on a wall, on eyeglasses, in the air, or on a structure. A user is able to request dispatch or cancel the triggered event notification using a hand waving motion or a predetermined physical motion.

In some embodiments, trajectory, velocity, and acceleration of the eye's pupil is detected. In some embodiments, a camera is used to capture images of the eye's pupil. In other embodiments, near-infrared lights (or other lights, like visible lights or UV) are used to illuminate the eye from various directions while photodiodes sense patterns of reflected light. Those reflections are used to infer the pupil's position and diameter in real-time through a lightweight algorithm based on supervised learning. As such, a user's hand touchless/non-touch control (e.g., command input to request dispatch or cancel the triggered event notification) is achieved. In an example, a user is able to look at a predetermined area (e.g., an image of "DISPATCH" icon) of a projected image. Software used in the security system disclosed herein determines that the user is looking at the DISPATCH icon and not the cancel icon, so that a commanding order of dispatch is requested through the software.

In other embodiments, the non-GUI based method includes presenting/notifying the user of the triggered alarm signal on a non-GUI based implementable media (e.g., a voice command input/output interface, such as using a microphone and loud-speakers on IPHONE®; a mechanical button as user's input receiving port), providing the triggered alarm related information (e.g., a video view of the alarm triggered scene), receiving user's commands and inputs, and/or a combination thereof.

In some other embodiments, a combination of GUI based and non-GUI based method is used to perform the entire or part of the UBAF procedure. For example, the alarm system notifies a user of a triggered alarm event by visually showing the alarm signal information on a display of a user's smart phone (a GUI based method) and the system receives a user's voice input as user's command (a non-GUI based method). In another example, the alarm system notifies a user of a triggered alarm event by both visually showing the alarm signal information on a display of a user's smart phone (a GUI based method) and concurrently a voice announcement of the event (a non-GUI based method). Next, the system is configured to receive either a user's voice input as user's command (a non-GUI based method), a user's finger touch on the touchscreen as an input (a GUI based method), or a combination thereof. A person of ordinary skill in the art would appreciate that a GUI based, a non-GUI based, or a combination thereof can be used to perform any portion of the procedures described above.

In some embodiments, the method 200A comprises a signal receiving process 212, signal presenting process 230, and a signal responding process 232.

At the signal receiving process 212, an alarm triggered signal or notification is received by a user's personal device 214 (such as, a smart phone (e.g., IPHONE®) and/or a wearable electronic device (e.g., IWATCH®). The alarm triggered signal can be started from one of predetermined sensors, such as a home security motion sensor, a health monitoring sensor (e.g., a fall sensor, a personal emergency response system "PERS"), and an industrial chemical safety sensor. A person of ordinary skill in the art would appreciate that any alarms or sensors that can be configured to monitor or detect an occurrence of a predetermined condition are within the scope of the present invention. Further, the notifications (e.g., the alarm triggered signal) can be transmitted in various forms, such as SMS message, WiFi signals, and any other wired/wireless electronic communications available in the past, today, or in the future. Furthermore, the notification can be formatted in various forms. For example, the notification can contain information containing messages (e.g., additional comments or messages, such as "computer image analysis shows that there are three people at premise"), images, verbal communication, and/or video about the status, condition, and progress of the triggered event. The notification can be either a one-time message, a continuous reporting, and/or periodic updating messages.

At the signal presenting process 230, the notification of the triggered alarm event can be provided by using either the GUI based method, the non-GUI based method, or a combination thereof.

In a GUI based method example, the notification is displayed on an LCD screen of a smart phone 214, wherein the display dynamically shows the notification/notifying message on the screen. A user is able to select or interact with the computer generated graphic based button, such as the dismiss alarm button 218 and the service requesting button 220 displayed on the screen. In some embodiments, the videos and images 216 of the monitored premise are displayed on the screen.

In a non-GUI based method example, the notification is displayed via voice message 226 and/or vibration, which can be communicated to the user in a non-visual only method.

In a combination notification (both GUI based and non-GUI based method) method, the notification can be displayed via the images on the touch screen, voice message 226, vibration, or a combination thereof.

At the signal responding process 232, a user's input (e.g., user's commands, user's responding actions, or user's information providing action) in response to the notification of the triggered alarm event can similarly use the GUI based method, the non-GUI based method, or a combination thereof (e.g., both GUI based and non-GUI based methods). For example, a user is able to input their command or actions via the GUI based method, such as selecting the computer generated graphic button 222A of "Dismiss" on the mobile phone 222. In another example, a user is able to input their command or actions via the non-GUI based method, such as the user is able to say the word "Dismiss" as a way of providing voice command 224. In another example, the method 200A can provide an instruction for the user to respond and follow as a way of receiving the user's command. For example, the method 200A causes the mobile phone to speak to the user "select the right side first button 228A to dismiss the alarm and select the right side second button 228B to request a call center to call back for further assistance" on the phone 226.

Figure 2B:
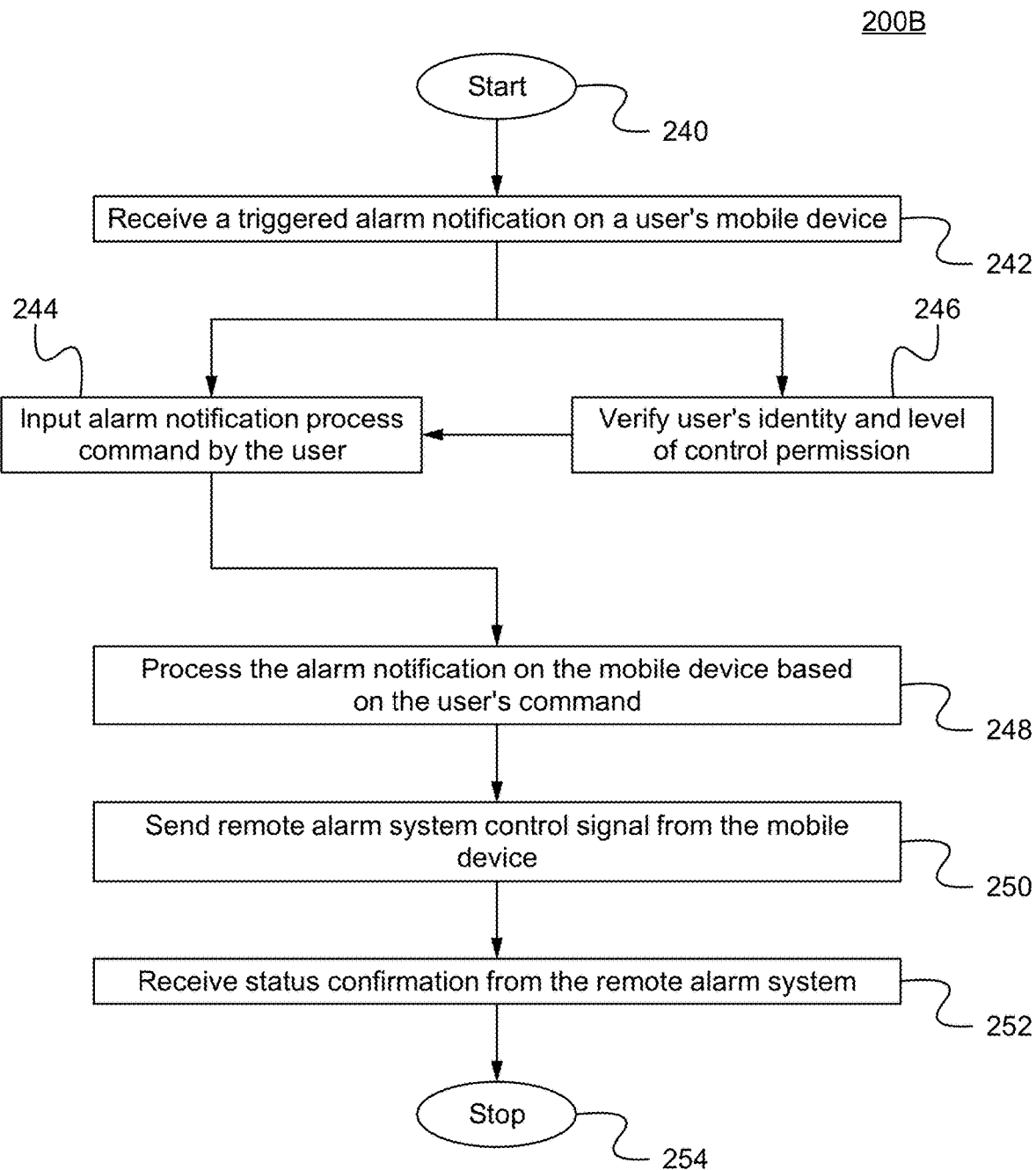
FIG. 2B is a flow chart illustrates an alarm signal filtering method in accordance with some embodiments.

FIG. 2B is a flow chart illustrating an alarm signal filtering method 200B in accordance with some embodiments. The method 200B can start at a Step 240. At a Step 242, a triggered alarm notification or a triggered event notification on a user's mobile device is received. Various communication methods can be used to transmit the notification signal, such as a telephone signal and an internet signal (e.g., WiFi).

At a Step 244, a command for alarm notification processing is received from the user by the mobile device or a second electronic device (such as a wearable device, iWatch, Fitbit), or a combination thereof. In some embodiments, the second electronic device receives the user's command (such as, voice command), which is subsequently transmitted to the user's main/first mobile device. In some other embodiments, the second electronic device directly communicates the user's command to a call center or the alarm system. The user's command can include dismiss the notification, dismiss the alarm system, and request further assistance (e.g., request a dispatch of an emergency care person to provide help).

At a Step 248, the alarm notification is processed on the mobile device based on the user's command. For example, when the user inputs a command of requesting further services, the user's mobile device generates a service request signal to be sent out to a service center (e.g., a call center). In another example, the user is able to transfer the notification to another person (such as a secretary, a person who is managing the premise, a person having more knowledge about the alarm triggered event (e.g., the nurse of a senior user)).

At a Step 250, the remote alarm system control signal is sent from the mobile device. For example, the service request signal that is generated/prepared at the Step 248 is transmitted to a call center via the communication system of the mobile device.

At a Step 252, the status confirmation from the remote alarm system is received. For example, the alarm status is received by the user's mobile device. When the alarm is shut off at the alarm system, a status check/status condition notification signal is sent back to the mobile device or the call center as a status confirmation signal.

In some embodiments, a Step 246 of verifying user's identify and control permission is used, which can be performed between any two of the steps described above or concurrently with any of the steps disclosed herein. The above described steps are all optional and can be used or omitted in various embodiments. In some embodiments, the Step 246 is performed between the Step 242 and the Step 244. The identity verification and permission verifying can be performed using various methods and devices. For example, requesting the user to provide a passcode or password or using biometrics (e.g., user's biological data/traits) for verification purpose. The biometrics can be fingerprints, facial recognition, eye iris and retina scanning, voice pattern, speech patterns, and any other physical/behavioral characteristics. The identity verification and/or permission verification can be performed separately or together. In some embodiments, the user's action of allowing their biological data/traits to be verified, which serve as the command of the users' action, such as canceling the alarm by allowing the user's eye scan to be performed.

In an example, when the mobile device receives an alarm triggered notification. The system installed/executed in the mobile device request the user to use their fingerprint to verify and cancel the alarm signal. In some embodiments, once the identity of the user is verified, the system described herein checks the permission level of the user in a database stored in the mobile phone, a call center, or any other datacenter locally or remotely. The user is able to execute a command based on their assigned permission level.

Figure 3:
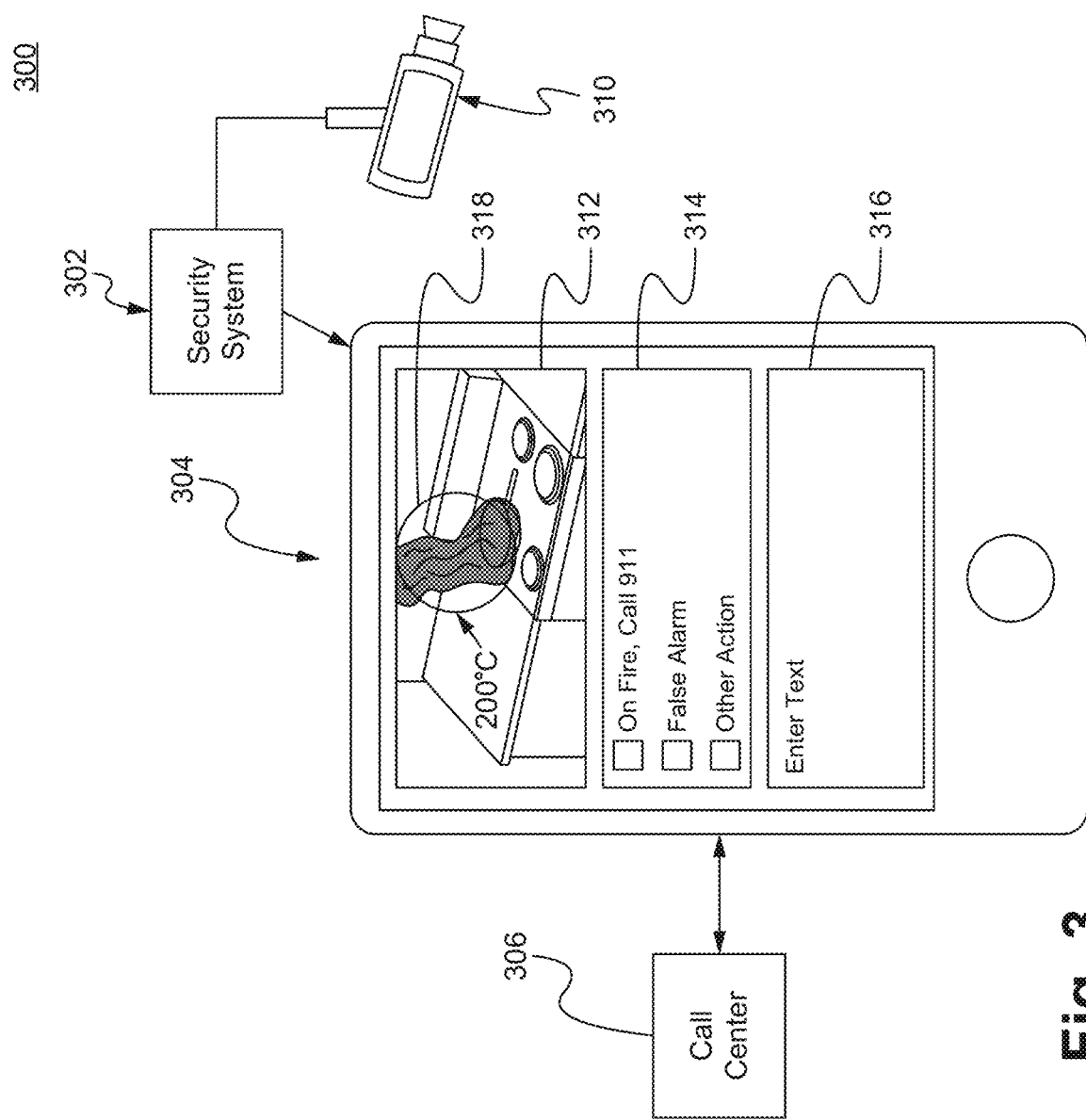
FIG. 3 illustrates a user assisted alarm warning method in accordance with some embodiments.

FIG. 3 illustrates a user assisted alarm warning method 300 in accordance with some embodiments. In some embodiments, the method 300 comprises using a security system 302 having a visual and/or premise conditions monitoring device 310 (e.g., a video camera, a thermal camera, or a chemical substance monitoring device). When the security system 302 senses a pre-determined triggered event, the security system 302 sends a warning notification to a user assisted device 304 (e.g., user's mobile phone), a visual image/video 312 is displayed on the user assisted device 304. For example, when a curtain is on fire, the thermal image camera 310 provides the visual image/video 312 (e.g., a thermal image/video) highlighting an abnormal thermal event, such as the circled event in 318 displays that a fire (e.g., abnormal heat event) is detected. The highlighting portion of the image can be enlarged or shown using special image/visual effects, such as showing temperature profile indicating the degree of the temperature (e.g., 200 degree C.). A person of ordinary skill in the art appreciates that any other special image/visual effects can be used as a way to communicate with the user of the abnormal alarm triggering event.

In some embodiments, the user assisted device 304 comprises a selection box for facilitating a check-box style communication, such that the user can efficiently communicate with the operator at the call center 306. A user is able to select one or more check-boxes 314 for assisting the call center 306 to provide faster service without or reducing the needs to analyze the situation by the call center's operator. In other words, the user analyzes the situation and provides conclusion or information, such that the operator of the call center can quickly understand the situation and perform proper assisting actions, such as calling 911 and providing more detailed information for the police to send proper assistance to the monitored premise. For example, in the case of a large fire, a fire station may decide to send 3 to 4 fire trucks to the premise, instead of sending only one fire truck to the premise only to find out that more fire trucks are needed.

In some embodiments, a text or verbal entering message box 316 is provided. The user is able to provide descriptions or communication with the operator at the call center 306, such that the operator at the call center 306 is able to more rapidly understand the situation at the premise.

In some embodiments, the operator of the call center 306 is able to select a portion or all of the messages/information at the check box 314 and/or message box 316 to be forwarded to an emergency assisting location, such as a fire department.

Figure 4:
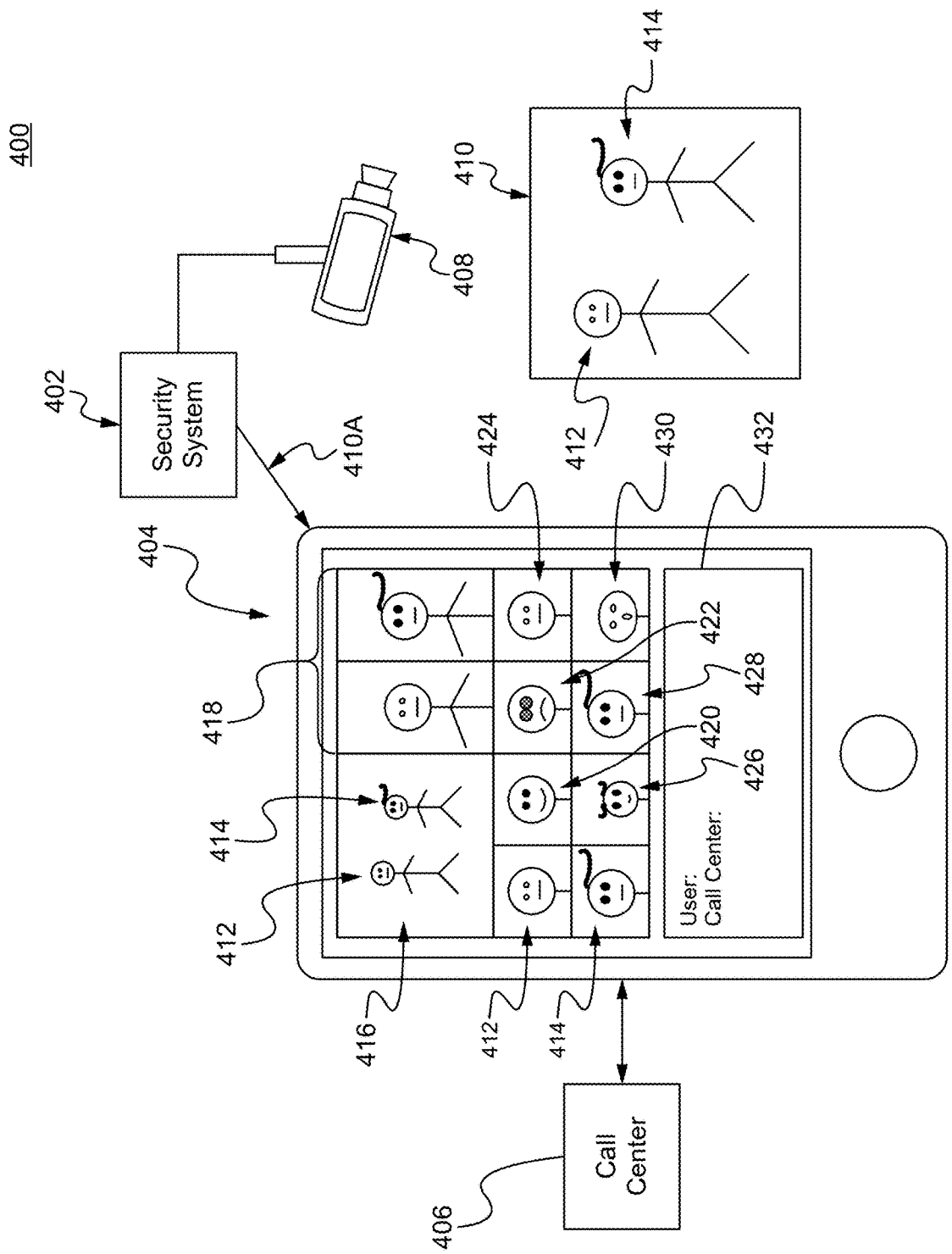
FIG. 4 illustrates a visual enhanced monitoring method in accordance with some embodiments.

FIG. 4 illustrates a visual enhanced monitoring method 400 in accordance with some embodiments. The method 400 is able to monitor a premise using a camera 408. The camera 408 takes a photo or video 410 of the premise constantly and/or an alarm triggered event. The image signal 410A of the premise image 410 is transmitted to a user's assisting device 404. In some embodiments, the image of the premise 410 is displayed on the user's assisting device 404 as a captured image 416, which shows the actual image (e.g., a snap shot) of the premise 410. Two individuals 412 and 414 that are detected by an image analyzing device/software are displayed on a close up/facial view 418. In some embodiments, a focus/zoom-in snap shot photo is further instructed to be taken to more clearly (display) the faces of the detected individuals 412 and 414.

In some embodiments, an image analyzing software is used to compare the headshots of the two individuals 412 and 414 in a computer database. By comparing the photo profiles or biometrics of the headshots 412 and 414, the computer can generate potential matches of the individuals 412 and 414. For example, the faces 420, 422, 424, 426, 428, and 430 are generated/selected by the computer as potential people identified. A user is able to determine and/or select a match helping the call center 406 to identify the person of interests. In some embodiments, a dialog box 432 is able to be used to facilitate the communication between the user and the operator of the call center 406.

In some embodiments, the person (e.g., the user of the mobile device 204 of FIG. 2) who assisted the service providing unit comprises a person having personal knowledge of the monitored premise and/or information related to the monitored premise or the subscriber (e.g., a personal subscriber or a company/entity subscriber). In some embodiments, a passcode is required to authorize a dismissal of the warming notification.

Figure 5:
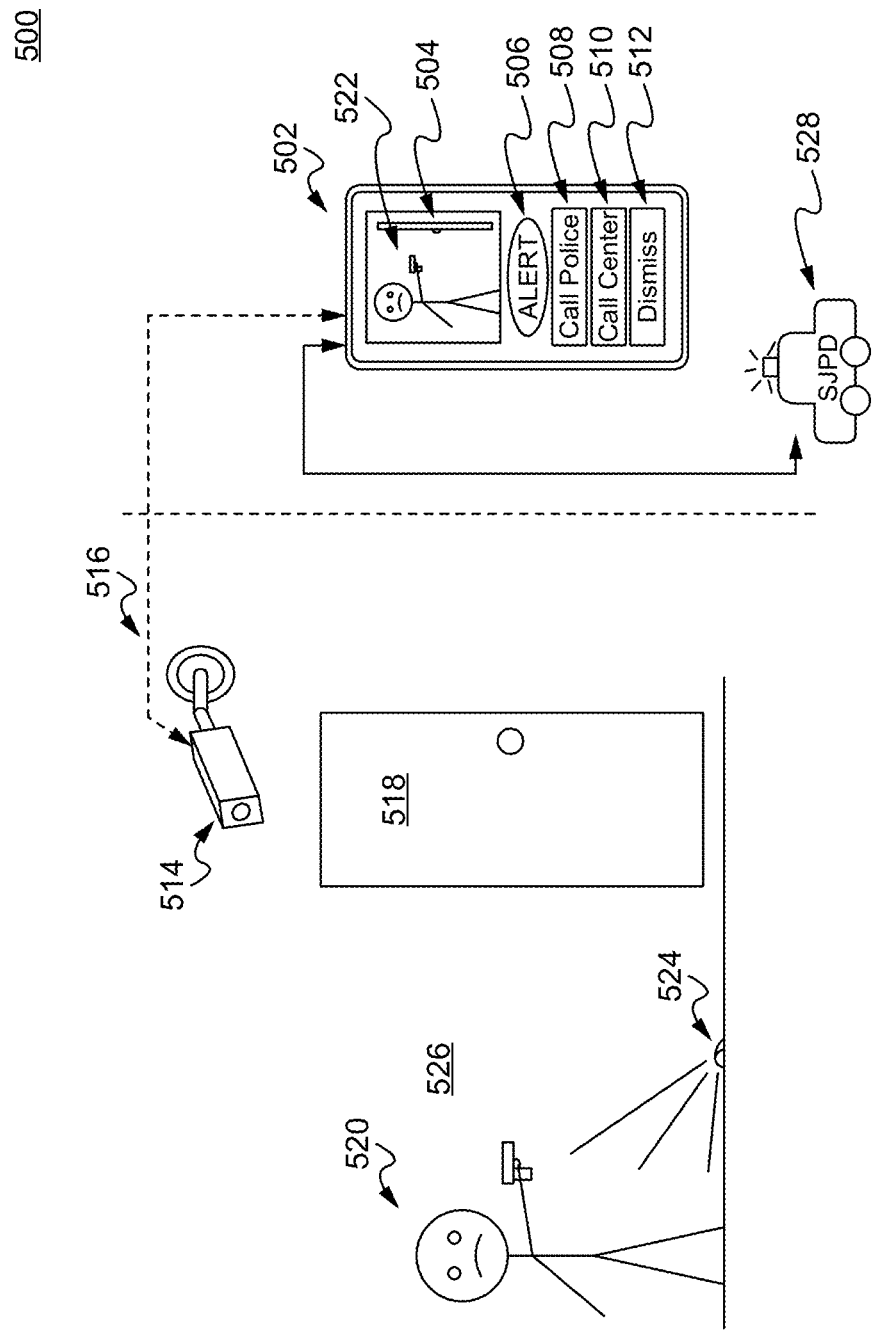
FIG. 5 illustrate a self-monitoring security system 500 in accordance with some embodiments.

FIG. 5 illustrate a self-monitoring security system 500 in accordance with some embodiments. In some embodiments, the system 500 comprises one or more sensors (e.g., motion sensors) for security guarding a premise. When the sensors (e.g., at activated status) senses a person 520 or moving object coming into a predetermined range or place (e.g., a front yard 526 of a house), the system 500 sends a triggered notification 516 to a user's designated device (such as a mobile phone 502) as a notification 506 on the mobile phone 502. The image 504 of the front yard 526 is taken through the camera 514 and transmitted to the mobile device 502, such that the user is able to see the person 520 or object in real-time who is entering into the predetermined range or place. For example, the person 520 at the front door 518 in the front yard 526 is shown in the image/video 504. The user is able to see/identify/enlarge the image 504 having the person 522 on the screen of his mobile phone 502. The user is able to serve as a filter of the triggered notification 516 by selecting one of the calling the police 508, calling the commercial call center 510, or dismissing the notification 512. In some embodiments, the option of calling the commercial call center 510 is not included, such that the user of the system 500 is able to self-monitor the security of the premise. In some embodiments, the camera 514 generates a sound (e.g., a constant beeping sound) to make the people/intruder aware that the camera is recording/functioning.

In some embodiments, the user chooses the selection of calling police 508 when receiving the triggered notification 516. Next, the mobile device 502 sends a dispatch request to a police department 528 using a pre-stored phone number of a local police department (e.g., the police department closest to the premise having the front yard 526.) In some embodiments, the system 500 comprises a pre-stored recording (e.g., voice and/or text) containing the information of the address of the premise and occurrence of the event, such that the police officer can quickly identify the location and come to help. For example, a recorded voice message by a user stating "Break-in notice at my home address at 500 Sierra Pine Street, San Jose, please send an officer to help!" is automatically played via the system 500 to the police department when the user selects the "Call Police" function 508. In some embodiments, a user or a security service provider is able to setup one or more pre-stored phone numbers on the system 500 (such as a local police department, a hospital, and/or a relative), a user is able to select one of the pre-stored numbers (e.g., click a GUI based button and/or verbally command) for the system 500 to pass on the triggered notification or seeking emergency help.

A person of ordinary skill in the art appreciates that all the functions performed by the devices disclosed throughout the disclosure are able to be performed in a method and procedure as some exemplary embodiments. Similarly, the procedures disclosed herein are able to be implemented using corresponding device or physical/electrical components. For example, when a video recording is disclosed, a video recorder is also disclosed herein.

The term "signal" (e.g., triggered signal or any terms that are used equivalent to signal or in conjunction with the term signal) used throughout the present specification is able to include numerical signal, audio signal, video signal, mechanical signal (e.g., vibration), or a combination thereof.

In utilization, the methods and devices can be used to reduce the call frequency and talking time of a service person in handling false call or emergency situation.

In operation, a warning/triggered notification is first received by a filter (e.g., a service subscribed user) and the user processes the information received before the notification is sent to the call center.

Embodiments of AI-Based Monitoring System

The present invention also discloses a second embodiment of the method of reducing false alarm notification. The method additionally applies an AI-based monitoring system to relieve the burden of requiring a user input to dismiss false alarms. The following reference numbers are referring to the numbers of the respective figures. For example, method 100 is referring to the method 100 in FIG. 1.

In one example, the method 100 can be modified to implement the second embodiment. The service providing unit 106 can be implemented using an artificial-intelligence-based (AI-based) monitoring system that may not require a human's discretion to dismiss false alarms. In examples, the service providing unit 106 is located in a call center for taking care of emergencies at its earliest. The service assisting unit 102 and/or the service assisting device 102A aids the AI-based monitoring system in dismissing resources in response to false alarms. Similarly, the security system 104 remotely aids the AI-based monitoring system (i.e., the service providing unit 106) in necessary data collection. The triggered warning signals 101 is also generated by the security system 104 to inform the AI-based monitoring system of abnormal conditions.

According to the second embodiment of the present invention, the service providing unit 106, (i.e., the AI-based monitoring system) is required to teach itself by observing various normal and potentially-abnormal subject features. The normal and potentially-abnormal subject features may include facial features, eye features, biometric features (such as fingerprints, voice features), motion features, gesture features, body shape features (whole or partial), text features, graphical features, sound features, odor features, and/or temperature features. In some examples, the security system 104 pre-collects various types of the above mentioned normal and potentially-abnormal features and feeds them to the service providing unit 106. In this way, the service providing unit 106 is capable of instantly determining any normal or abnormal events occurring at a target region where the security system 104 and its sensors locate.

In some examples, each type of potentially-abnormal feature (e.g., characterized event or characteristic) is given a potential risk (grade) by the AI-based monitoring system while training the service providing unit 106. A higher score indicates a higher potential risk.

For example, a high-risk fire alarm event, e.g., an image indicating an uncontrolled fire, is graded with a higher score, whereas a low-risk fire alarm event, e.g., an image of a campfire used for a barbeque party, is graded with a lower score.

For example, a detected person who is unauthorized at the target region is graded with a higher score. A detected person who is authorized at the target region but not at an unauthorized time is graded with a middle score. A detected person who is authorized at the target region and appears at an authorized time is graded with a low score.

For example, a detected extremely high or extremely low temperature (e.g. detected usage of a welding torch or xenon gun that may be used to breach a secured door) is graded with a high score, whereas a middle range temperature is graded with a low score.

For example, a detected person or object (e.g. a vehicle, a machine, or a tool) without any text or graphical features authorized to be present at the target region is graded with a high score, whereas a detected person or object having such authorized features is graded with a low score.

For example, a detected sound that indicates an unusual event (e.g. sounds of gunshots or explosives) for the target region is graded with a high score, whereas a detected sound that indicates a regular event for the target region is graded with a low score.

After training the service providing unit 106 with various potentially normal or abnormal features, the service providing unit 106 is formally connected to the target region for working on the monitoring task. In addition, results of the abovementioned trainings may be stored in a database that the service providing unit 106 can arbitrarily access the trained potentially normal or abnormal features. Moreover, trained features of authorized people and/or authorized object of the target region can also be stored in the database for future recognition. Identities and/or permission level of the authorized people and/or authorized object can also be stored in the database for necessary confirmation.

In some examples, when the security system 104's sensors detect occurrence of at least one trained potentially-abnormal feature (from a person or an object) at the target region, the security system 104 first generates a triggered notification (i.e., the triggered signals 101) to the service assisting unit 102 and the service providing unit 106 in turn as a quick response for preliminary preparations. The triggered notification carries all the detected potentially-abnormal features at the target region. Other details of the triggered notification are the same as those about the triggered signals 101 mentioned above, such that repeated descriptions are skipped for brevity.

Then, the service providing unit 106 further confirms if the triggered notification is a false alarm by determining its potential risk. Note that the service providing unit 106 regards a security level of any received triggered notification to be an urgent level by default, for handling any crisis at the most expedited level.

First, the service providing unit 106 confirms potential risks by checking respective score indicated by all the detected potentially-abnormal features at the target region, for example, by referencing a storage device that keeps all scores of previously-trained potentially-abnormal features. Second, the service providing unit 106 determines a current potential risk of the target region by adding up checked scores of all the detected potentially-abnormal features at the target region. Third, when the current potential risk exceeds a predetermined substantial amount/ratio (e.g., greater than 50.1% or a substantial amount of resources), the service providing unit 106 regards the triggered notification-indicating a crisis that requires immediate measures. Since the service providing unit 106 is located and managed by a call center, the service providing unit 106 is capable of collecting required resources at a fastest manner to handle such crisis. If the current potential risk fails to exceed the predetermined substantial amount/ratio, the service providing unit 106 degrades the triggered notification's security level from the by-default urgent level to a precautionary level. Also, the service providing unit 106 notifies the call center of the reduced urgency of the triggered notification. Such that the service providing unit 106 can direct the call center to correspondingly reduce the required resources for handling the precautionary-level event without overusing resources.

In some examples, when the service providing unit 106 is making a decision about whether to reduce the urgency of the triggered notification, the service providing unit 106 remotely directs the security system 104 to use its sensors for detecting abnormal features, on a detected person or a detected object, based on the previously trained potentially-abnormal features.

In the case that the detected potentially-abnormal features includes at least one close-up headshot of one or more person, the close-up headshots are compared in the database that the service providing unit 106 can access. Eye scanning may also be performed for the security system 104's detection; such that the service providing unit 106 can determine if the detected person is authorized for the target region by comparing previously stored images of such detected person, which are pre-stored during the training of the service providing unit 106. In addition, the service providing unit 106 can further confirm identity and permission level of the detected person to confirm if he/she has sufficient authorization at the time when he/she is detected by the security system 104. If the service providing unit 106 finds that the detected person has a match in the database and is authorized at the detected time, the service providing unit 106 approves resource reduction at the call center for responding to the triggered notification with a correct warning level.

In the case that the detected potentially-abnormal features includes at least one fingerprint of one or more person, the detected fingerprint are compared in the database that the service providing unit 106 can access. Such that the service providing unit 106 can determine if the detected person is authorized for the target region by comparing previously stored fingerprints of such detected person, which are pre-stored during the training of the service providing unit 106. In addition, the service providing unit 106 can further confirm identity and permission level of the detected person to confirm if he/she has sufficient authorization at the time when he/she is detected by the security system 104. If the service providing unit 106 finds that the detected person has a match in the database and is authorized at the detected time, the service providing unit 106 approves resource reduction at the call center for a correct response to the triggered notification without wasting unnecessary resources.

In the case that the detected potentially-abnormal features includes at least one voice feature of one or more person, the voice feature is compared in the database that the service providing unit 106 can access. Such that the service providing unit 106 can determine if the detected person is authorized for the target region by comparing previously stored voice features of such detected person, which are pre-stored during the training of the service providing unit 106. In addition, the service providing unit 106 can further confirm identity and permission level of the detected person to confirm if he/she has sufficient authorization at the time when he/she is detected by the security system 104. If the service providing unit 106 finds that the detected person has a match in the database and is authorized at the detected time, the service providing unit 106 approves resource reduction at the call center for responding to the triggered notification with a correct warning level.

In the case that the detected potentially-abnormal features includes at least one motion feature of one or more person or object, the motion feature is compared in the database that the service providing unit 106 can access. Such that the service providing unit 106 can determine if the detected person or object is authorized for the target region by comparing previously stored motion features of such detected person or object, which are pre-stored during the training of the service providing unit 106. In addition, the service providing unit 106 can further confirm identity and permission level of the detected person or object to confirm if he/she/it has sufficient authorization at the time when he/she/it is detected by the security system 104. If the service providing unit 106 finds that the detected person or object has a match in the database and is authorized at the detected time, the service providing unit 106 approves resource reduction at the call center for responding to the triggered notification with a correct warning level.

In the case that the detected potentially-abnormal features includes at least one gesture feature of one or more person, the gesture feature is compared in the database that the service providing unit 106 can access. Such that the service providing unit 106 can determine if the detected person is authorized for the target region by comparing previously stored gesture features of such detected person, which are pre-stored during the training of the service providing unit 106. In addition, the service providing unit 106 can further confirm identity and permission level of the detected person to confirm if he/she has sufficient authorization at the time when he/she is detected by the security system 104. If the service providing unit 106 finds that the detected person or object has a match in the database and is authorized at the detected time, the service providing unit 106 approves resource reduction at the call center for responding to the triggered notification with a correct warning level.

In the case that the detected potentially-abnormal features includes at least one body shape feature of one or more person or object, the body shape feature is compared in the database that the service providing unit 106 can access. Such that the service providing unit 106 can determine if the detected person is authorized for the target region by comparing previously stored body shape features of such detected person or object, which are pre-stored during the training of the service providing unit 106. In addition, the service providing unit 106 can further confirm identity and permission level of the detected person to confirm if he/she has sufficient authorization at the time when he/she is detected by the security system 104. If the service providing unit 106 finds that the detected person has a match in the database and is authorized at the detected time, the service providing unit 106 approves resource reduction at the call center for responding to the triggered notification with a correct warning level.

In the case that the detected potentially-abnormal features includes at least one biometric feature of one or more person, the biometric feature is compared in the database that the service providing unit 106 can access. Such that the service providing unit 106 can determine if the detected person is authorized for the target region by comparing previously stored biometric features of such detected person, which are pre-stored during the training of the service providing unit 106. In addition, the service providing unit 106 can further confirm identity and permission level of the detected person to confirm if he/she has sufficient authorization at the time when he/she is detected by the security system 104. If the service providing unit 106 finds that the detected person has a match in the database and is authorized at the detected time, the service providing unit 106 approves resource reduction at the call center for responding to the triggered notification with a correct warning level.

In the case that the detected potentially-abnormal features includes at least one text/graphical/sound/odor feature of one or more person or object, the text/graphical/sound/odor feature is compared in the database that the service providing unit 106 can access. Such that the service providing unit 106 can determine if the detected person or object is authorized for the target region by comparing previously stored text/graphical/sound/odor features of such detected person or object, which are pre-stored during the training of the service providing unit 106. In addition, the service providing unit 106 can further confirm identity and permission level of the detected person or object to confirm if he/she/it has sufficient authorization at the time when he/she/it is detected by the security system 104. If the service providing unit 106 finds that the detected person or object has a match in the database and is authorized at the detected time, the service providing unit 106 approves resource reduction at the call center for responding to the triggered notification with a correct warning level.

In some examples, the service providing unit 106 directs the security system 104 to further recognize if the detected person or object is a person or object by scanning his/her/its temperature profile. Due to the fact that a live human body has a roughly-similar body heat distribution the service providing unit 106 can be pre-trained to correctly recognizing a human body's temperature distribution verses a nonliving or non-human object. With the aid of such temperature features, the service providing unit 106 can make the above resource reduction decision more efficiently by perceiving a detected person and/or a detected object in advance.

In some examples, confirming a dismissal of the triggered event notification without using a displayed control interface on the mobile device as an input of a dismissal command, requesting the user to confirm a triggered alarm or dismiss the triggered event notification using the mobile device using a non-GUI based user interface, and using a control receiver outside of a display area of a user interface on the mobile device include using one or more of the following predetermined control input to (1) enter/provide/receive a command without using any displayed GUI, (2) enter/provide/receive a command without physically touch the displayed GUI, and (3) enter/provide/receive a command by physically touching the displayed GUI and also with one or more other motions.

The predetermined control input includes (1) using a voice command, (2) scanning a QR code or a bar code, (3) using a camera to monitor/map the eye movements as a method of providing input command (such as tracking user's eyeballs looking at a projected image (e.g., dispatch/cancel the triggered event notification)), (4) receiving an command input via tracking user's hand gesture (such as having an image projected in the air or on a screen allow a user to wave or any other physical motion as a request/command to dispatch/request assistance from a call center or cancel the triggered event notification), (5) using one or more control device outside of a displayed GUI area (such as one or more mechanical buttons on the side of the mobile device that is not within the area of the displayed GUI), and (6) using one or more control device/mechanisms inside or within the display area of the GUI while the actual control is not received via the display GUI (such as a mechanical button within the displayed GUI area).

In some examples, a triggered event notification is displayed via GUI. In some other examples, a triggered event notification is displayed without using a displayed GUI (such as alarm sound or voice notification).

The description is presented to enable one of ordinary skill in the art to make and use the invention. Various modifications to the described embodiments are readily apparent to those persons skilled in the art and the generic principles herein can be applied to other embodiments. Thus, the present invention is not intended to be limited to the embodiments shown but is to be accorded the widest scope consistent with the principles and features described herein. It is readily apparent to one skilled in the art that other modifications can be made to the embodiments without departing from the spirit and scope of the invention as defined by the appended claims.

What is claimed is:

1. A system for reducing a false alarm notification to a call center comprising:
    a) a security system configured to send a triggered event notification to a mobile device, wherein the mobile device is configured to filter out a falsely triggered event notification before the triggered event notification is transmitted to a call center as a verified triggered event notification, wherein the triggered event notification is degraded from a by-default urgent level to a precautionary level by an AI-based monitoring system when a current potential risk level evaluated by the AI-based monitoring system fails to exceed a predetermined threshold; and
    b) a call center configured to receive the verified triggered event notification from the mobile device.

2. The system of claim 1, wherein the call center further comprises a receiving channel configured to receive the falsely triggered event notification.

3. The system of claim 2, wherein the receiving channel configured to receive the falsely triggered event notification is separate from a receiving channel of the verified triggered event notification.

4. The system of claim 1, wherein the mobile device comprises a non-GUI based control receiving member configured to receive a control command from a user to filter out the falsely triggered event notification.

5. The system of claim 1, wherein the mobile device comprises a control receiving member external to a displaying area on the mobile device, wherein the control receiving member is configured to receive a control command from a user to filter out the falsely triggered event notification.

6. The system of claim 1, wherein the mobile device comprises a voice control receiving member configured to receive a control command from a user to filter out the falsely triggered event notification.

* * * * *